United States Patent
Ramoju et al.

(10) Patent No.: US 11,551,213 B1
(45) Date of Patent: Jan. 10, 2023

(54) SPECIALIZED TRANSACTION EXECUTION VIA ASSISTIVE DEVICES

(71) Applicant: Bank of America Corporation, Charlotte, NC (US)

(72) Inventors: Eswara Prasad Ramoju, Telangana (IN); Udaya Kumar Raju Ratnakaram, Hyderabad (IN); Sandeep Kumar Chauhan, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 17/388,318

(22) Filed: Jul. 29, 2021

(51) Int. Cl.
 *G06Q 20/38* (2012.01)
 *G06Q 20/32* (2012.01)
 *G06Q 20/40* (2012.01)
 *G06Q 20/20* (2012.01)

(52) U.S. Cl.
 CPC .......... *G06Q 20/389* (2013.01); *G06Q 20/20* (2013.01); *G06Q 20/3278* (2013.01); *G06Q 20/401* (2013.01)

(58) Field of Classification Search
 CPC .................................................. G06Q 20/389
 See application file for complete search history.

(56) References Cited

U.S. PATENT DOCUMENTS

| | | | |
|---|---|---|---|
| 5,149,947 A | 9/1992 | Collins, Jr. | |
| 6,910,697 B2 | 6/2005 | Varatharajah et al. | |
| 2016/0277380 A1* | 9/2016 | Wagner | H04L 63/0861 |
| 2017/0200152 A1 | 7/2017 | Winkler et al. | |
| 2022/0044225 A1* | 2/2022 | Watkins | G06Q 20/3278 |

* cited by examiner

*Primary Examiner* — Arunava Chakravarti
(74) *Attorney, Agent, or Firm* — Weiss & Arons LLP

(57) ABSTRACT

Systems, methods, and apparatus are provided for secure transaction execution at an assistive device. Assistive devices include technologies that support people with disabilities in daily tasks, such as mobility aids or vision aids. An assistive device may be preregistered with a financial institution. The financial institution may generate a first hash incorporating a customer identifier and a device identifier. At the time of transaction, an active session may be initiated with the assistive device at a POS terminal, self-service kiosk, or financial institution. The assistive device may use short range wireless communication such as NFC or UWB to transmit the customer identifier and device identifier. A second hash may be generated and compared to the first hash to authenticate the device. Following authentication, the transaction may be completed at the assistive device via user inputs to the assistive device.

14 Claims, 4 Drawing Sheets

SPECIALIZED TRANSACTION EXECUTION VIA ASSISTIVE DEVICES

FIELD OF TECHNOLOGY

Aspects of the disclosure relate to secure transaction execution via a personal assistive device.

BACKGROUND OF THE DISCLOSURE

People with disabilities may encounter challenges in the activities of daily living. Assistive technology, including assistive, adaptive and rehabilitative devices, can help provide greater independence. Examples of assistive devices include wheelchairs, walkers, hearing aids, screen readers and refreshable braille displays.

One area where problems may arise is in the realm of financial transactions. A customer dependent on assistive technology may face challenges carrying out a conventional transaction at an automated teller machine ("ATM") or at a point of sale ("POS"). The customer may need to hand over an access card or payment card to a caregiver or cashier to complete the transaction. However, exposing a card containing sensitive information creates a serious security risk.

It would be desirable to enable an assistive device to interact directly with a point-of-sale terminal or with financial institution technology and allow a user to complete a transaction via the assistive device.

SUMMARY OF THE DISCLOSURE

Systems, methods, and apparatus for secure execution of a transaction via an assistive device are provided.

The assistive device may be registered by a financial institution or other enterprise. A customer identifier and an assistive device identifier may be received at a banking channel. The institution or enterprise may generate a first hash from the customer identifier and device identifier. The first hash may be stored in a reference database as a reference hash in association with any suitable customer identification.

At a point of transaction, an active session may be established with the assistive device through short-range wireless communication. The customer identifier and device identifier may be obtained directly from the assistive device. A second hash may be generated from the customer identifier and the device identifier and compared with the first hash to authenticate the assistive device.

In response to authentication of the device, transaction data may be transmitted to the assistive device. The transaction may be completed via an input at the assistive device, such as selection of a payment instrument or consent to the transaction. The transaction may be executed in response to the input at the assistive device.

In some embodiments, a requirement for entry of a personal identification number ("PIN") may be disabled in response to authentication of the assistive device.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
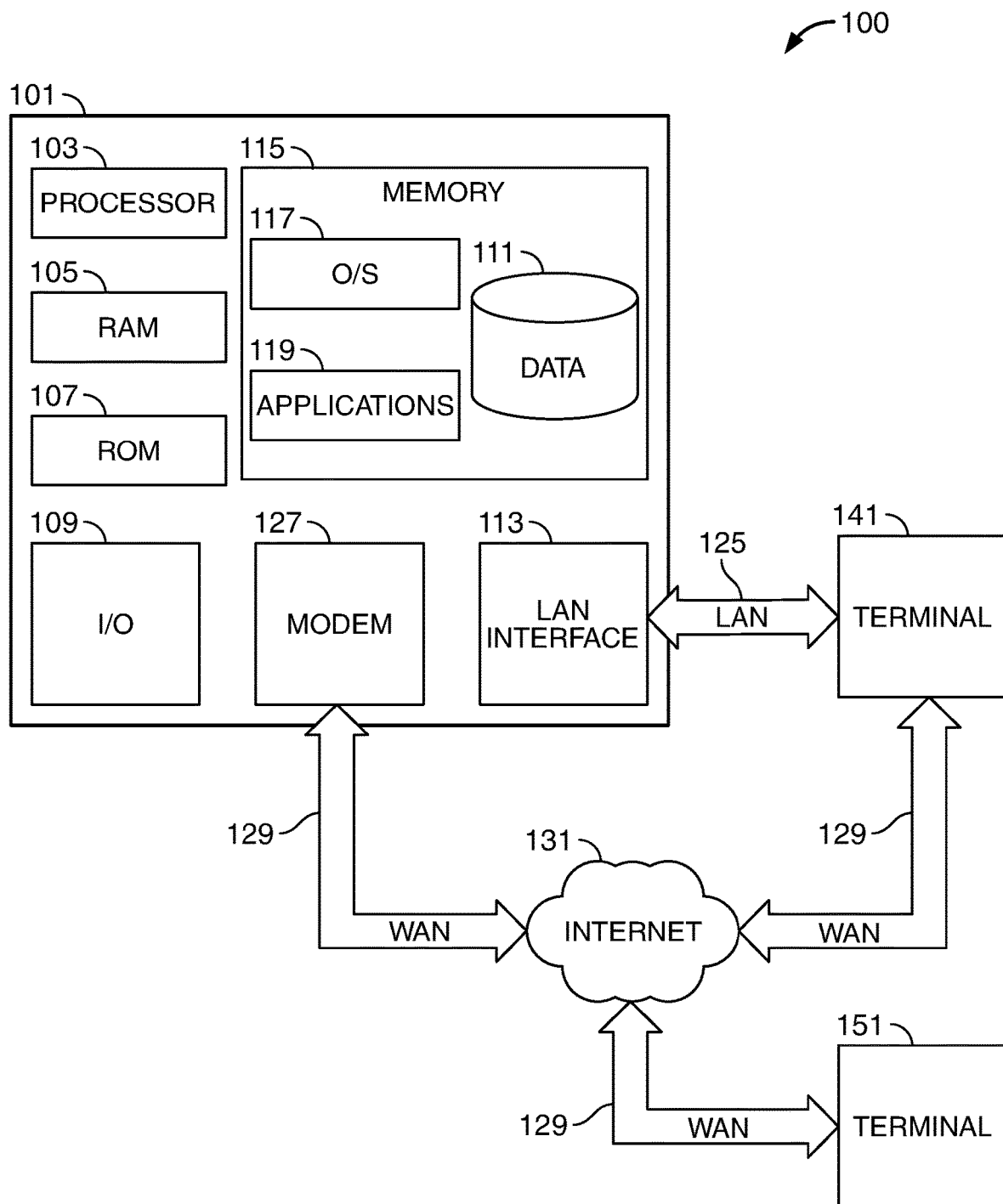
FIG. 1 shows illustrative apparatus in accordance with principles of the disclosure.

Systems, methods, and apparatus for secure execution of a transaction via an assistive device are provided.

For the sake of illustration, the invention will be described as being performed by a "system." The system may include one or more features of apparatus and methods that are described herein and/or any other suitable device or approach.

The system may include an assistive device. Assistive devices include technologies that support people with disabilities in daily tasks. Illustrative assistive devices may include mobility aids such as a walker, rollator, electric wheelchair, or power scooter.

Illustrative assistive devices may include vision aids such as a screen reader device, screen magnifier device, or refreshable braille device. A screen reader may convert screen content to voice commands and may accept voice-based input from a user to select from among the options presented. A refreshable braille device may connect wirelessly to a computer screen and convert screen content to a tactile braille display.

Illustrative assistive devices may include hearing aids or other wearable technology.

The assistive device may include embedded or partially embedded hardware and software components. The assistive device may include one or more microprocessors. The assistive device may include one or more software applications. The applications may enable the assistive device to execute various tasks. One or more of the software applications may be executed on the processors. Software applications may be stored in a memory embedded in the assistive device.

The assistive device may include one or more displays. The assistive device may include one or more communication transceivers. The communication transceivers may be operable to communicate with an external processor. The external processor may be located within a POS terminal, a mobile device, a self-service kiosk, a financial institution computer or any other suitable computing device.

The assistive device may include a battery. The battery may be configured to power hardware components such as the microprocessor(s). The battery may be rechargeable.

The assistive device may include one or more cameras for capturing images and/or videos, one or more audio input devices, and one or more audio output devices.

Assistive device inputs from a user may be hands-on. Assistive device inputs from a user may be hands-free. In some embodiments, assistive device inputs may involve a combination of hands-on and hands-free protocols.

In some embodiments, the assistive device inputs may be hands-on. The assistive device may require the use of touch buttons or adaptive switches. In some embodiments, the user input may also be entered via a touch screen incorporated into or attached to a frame of the assistive device. The touch screen may be a light emitting diode ("LED") touch screen. The touch screen may be an organic light emitting diode ("OLED") touch screen.

The touch screen may receive touch-based user input. Touch-based gestures may include swiping, tapping, squeezing, and any other suitable touch-based gestures or combination of touch-based gestures.

In some embodiments, the assistive device inputs may be hands-free. The assistive device may receive hands-free input through voice commands, eye tracking, gesture recognition, or any other suitable method. Gesture recognition may include air-based hand and/or body gestures. Air-based gestures may be performed without touching the assistive device.

The assistive device may include one or more sensors. Illustrative sensors may include a touch screen, camera, accelerometer, gyroscope, and any other suitable sensors. The assistive device sensors may detect hands-free input such as air gestures or eye movement.

The input protocols may be dictated by the structure of the assistive device and/or the needs of the user. For example, inputs for mobility aids may be received via joystick, sip-and-puff controls, head switches, or any suitable method.

The assistive device may include a wireless network interface. The wireless interface may provide the assistive device with a dedicated, full-time connection to a wireless network. The wireless interface may implement the physical layer circuitry necessary for communicating with a data link layer standard, such as Wi-Fi. The wireless interface may support input/output ("I/O"), interrupt, direct memory access, interfaces, data transmission, network traffic engineering and/or partitioning.

The assistive device may include one or more options for short-range wireless communication. For example, the assistive device may include an active near field communication ("NFC") reader configured to establish contactless communication with a computing device located within a predetermined proximity to the assistive device.

The assistive device may include short-range wireless communication via Bluetooth® technology. Bluetooth® is a short-range wireless technology standard that is used for exchanging data over short distances using UHF radio waves.

The assistive device may include ultra-wideband ("UWB") communication technology for short-range data transfer. UWB uses very low energy radio waves for short-range, high-bandwidth communications.

In some embodiments, the assistive device may be configured to connect to a computing device using a wired communication application. The assistive device may include a port for attaching a cable to a computing device managing a transaction.

The system may enable a user to register an assistive device with a financial institution or other enterprise. The user may interact with the financial institution at a variety of banking channels. Illustrative banking channels include a mobile banking application, an ATM, a financial center location, or any suitable interface.

The banking channel may obtain customer information from the user. The customer information may include a customer identifier such as a name or account number. Other illustrative customer identifiers include customer address, access card number, PIN, or any suitable customer identifier. The banking channel may obtain a device name and device identifier from the user.

In some embodiments, the banking channel may communicate directly with the assistive device via short-range wireless communication such as NFC or UWB. The banking channel may receive a customer identifier from the device. The banking channel may receive a device name and/or device identifier directly from the assistive device. For additional security, the device identifier may be encoded in the assistive device hardware. For example, the device identifier may be encoded in a microchip embedded in the assistive device.

The financial institution may encrypt the customer data and device data. The banking channel may transmit the customer data and device data to a device hash generation algorithm. The algorithm may generate a first hash that incorporates both a customer identifier and the device identifier.

The first hash may be stored as a reference hash in a customer reference database on a bank server, in the cloud, or in any suitable medium. The reference hash may be stored in association with any suitable customer identifier.

The system may enable a user to execute transactions via a registered assistive device. The transactions may be in-person transactions. The transactions may be executed at a self-service kiosk, a financial institution, a POS, or any suitable location.

At the time of transaction, the device may be authenticated. In one illustrative embodiment, a POS terminal may establish an active session with the assistive device. The assistive device may transmit customer identification data and device identification data to the POS terminal using short-range wireless communication such as NFC, UWB, or Bluetooth®.

The POS terminal may transmit the data to a POS transaction server. A device hash generation module may be installed at the POS server. The module may generate a second hash using the customer data and device data obtained from the assistive device at the POS.

The POS transaction server may request the reference hash from the customer reference database. A customer verification module may be installed at the POS transaction server. The module may perform a comparison of the second hash generated at the POS with the reference hash. Based on the outcome of the comparison, the verification module may validate the device hash and authenticate the device to the POS terminal.

In some embodiments, the system may determine a percentage correlation between the reference hash and the second hash generated at the transaction site. If the percentage correlation is below a predetermined threshold, the transaction may be completed at the POS terminal. If the percentage correlation meets or exceeds a predetermined threshold, the transaction may be completed at the assistive device.

In some embodiments, authentication may be carried out by the financial institution instead of a POS system. The POS terminal may transmit the customer identification data and device identification data to the financial institution. The financial institution may generate a hash using the customer data and device data obtained from the assistive device at the POS. The financial institution may compare the hash with the reference hash and transmit an authentication result to the POS terminal.

Following authentication, the POS terminal may transmit transaction data to the assistive device. The customer may use the assistive device to complete the transaction. For example, the customer may select a payment option or approve a payment amount. The transaction data may be displayed on a display associated with the assistive device. The transaction data may be communicated to the user as an audio output.

Depending on the capabilities of the assistive device, the transaction may be completed using voice commands, joystick controls, touch screen inputs, eye tracking, or any suitable input method. A transaction processing engine may transmit the transaction data to a payment processing system.

The user may input payment instrument information, consent to a transaction or any other suitable information. In some embodiments, the user may select from stored payment options or from virtual cards in a digital wallet. In some embodiments, a payment instrument may be preregistered along with the assistive device and stored in the reference database. In some embodiments a customer account identified during registration of the assistive device may be debited for the transaction.

In some embodiments, a mobile device may be integrated with the assistive device using wireless technology. Illustrative mobile devices include smartphones, tablets, watches, and any other suitable mobile device. In some embodiments, the mobile device may be integrated using wired technology such as a cable or docking cradle. After the transaction data is transmitted to the authenticated assistive device, the transaction may be completed via input to the integrated mobile device.

While the above illustration describes a POS scenario, the assistive device may also be authenticated and used to complete a transaction at other locations including a financial institution or a self-service kiosk such as an ATM. User input at an authenticated assistive device may select a transaction option, select a payment instrument or access card, deposit, withdraw or transfer funds, select a payment amount, consent to a transaction, or perform any suitable tasks. In some embodiments, user input at an authenticated assistive device may execute a digital signature on a document or submit electronic consent to a service or disclosure.

In some embodiments, PIN or one-time PIN ("OTP") security features that are normally associated with a payment method may be disabled following authentication of the assistive device. Eliminating PIN or OTP requirements may streamline transactions and remove additional barriers for people with disabilities.

In some embodiments, account security features may restrict a payment instrument to transactions carried out via the assistive device. These additional security features protect against use of misappropriated payment data. Even if an NFC transfer at a POS were to be compromised by a bad actor, the data could not be used for a transaction without physical access to the assistive device.

One or more non-transitory computer-readable media storing computer-executable instructions are provided. When executed by a processor on a computer system, the instructions may perform a method for securely executing a transaction via an assistive device.

The method may include receiving a customer identifier and an assistive device identifier at a banking channel and generating a first hash from the customer identifier and device identifier. The first hash may be stored in association with any suitable customer identification.

The method may include establishing an active session with the assistive device through short-range wireless communication at a point of transaction. The customer identifier and/or device identifier may be obtained directly from the assistive device. In some embodiments, the customer identifier and/or device identifier may be obtained from the customer.

The method may include generating a second hash from the customer identifier and the device identifier and comparing the second hash with the first hash to authenticate the device.

The method may include, in response to authentication of the device, transmitting transaction data to the assistive device. The method may include receiving an input at the assistive device to complete the transaction. The input may include selection of a payment instrument, entry of a payment amount, consent to the transaction, or any suitable input. The transaction may be executed based on the input at the assistive device.

In some embodiments, the method may include disabling a requirement for entry of a PIN in response to authentication of the assistive device.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

Figure 2:
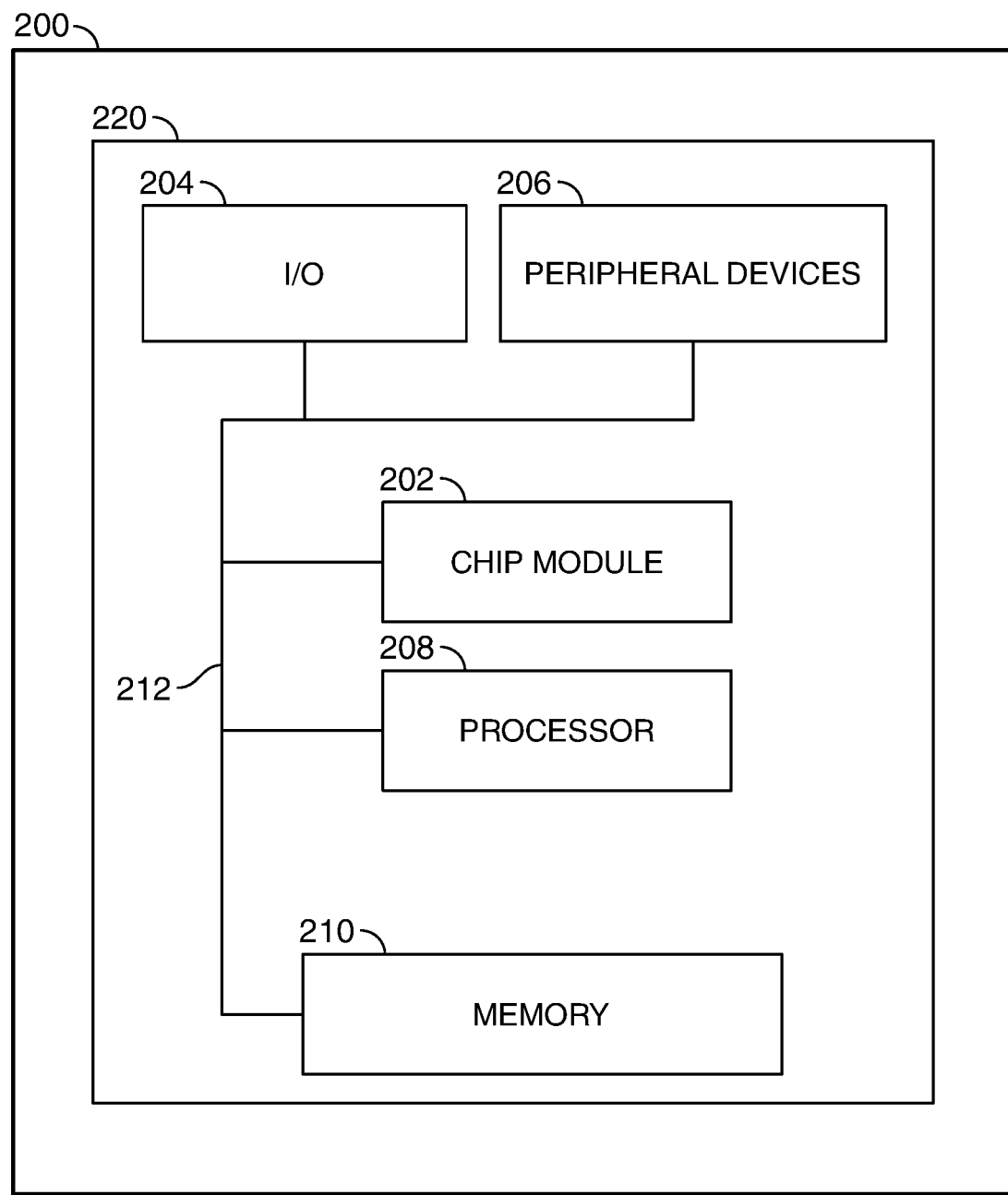
FIG. 2 shows illustrative apparatus in accordance with principles of the disclosure.

FIG. 2 shows an illustrative apparatus 200 that may be configured in accordance with the principles of the invention.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and associated database 111.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of registering an assistive device, authenticating an assistive device, generating a first hash, generating a second hash, comparing the first hash and the second hash, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

FIG. 2 shows an illustrative apparatus 200 that may be configured in accordance with the principles of the invention.

Apparatus 200 may be a computing machine. Apparatus 200 may include one or more features of the apparatus that is shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may register an assistive device, authenticate an assistive device, generate a hash based on customer and device identifiers, and perform other methods described herein; and machine-readable memory 210.

Machine-readable memory 210 may be configured to store in machine-readable data structures: customer data, device data, hash data, transaction data, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
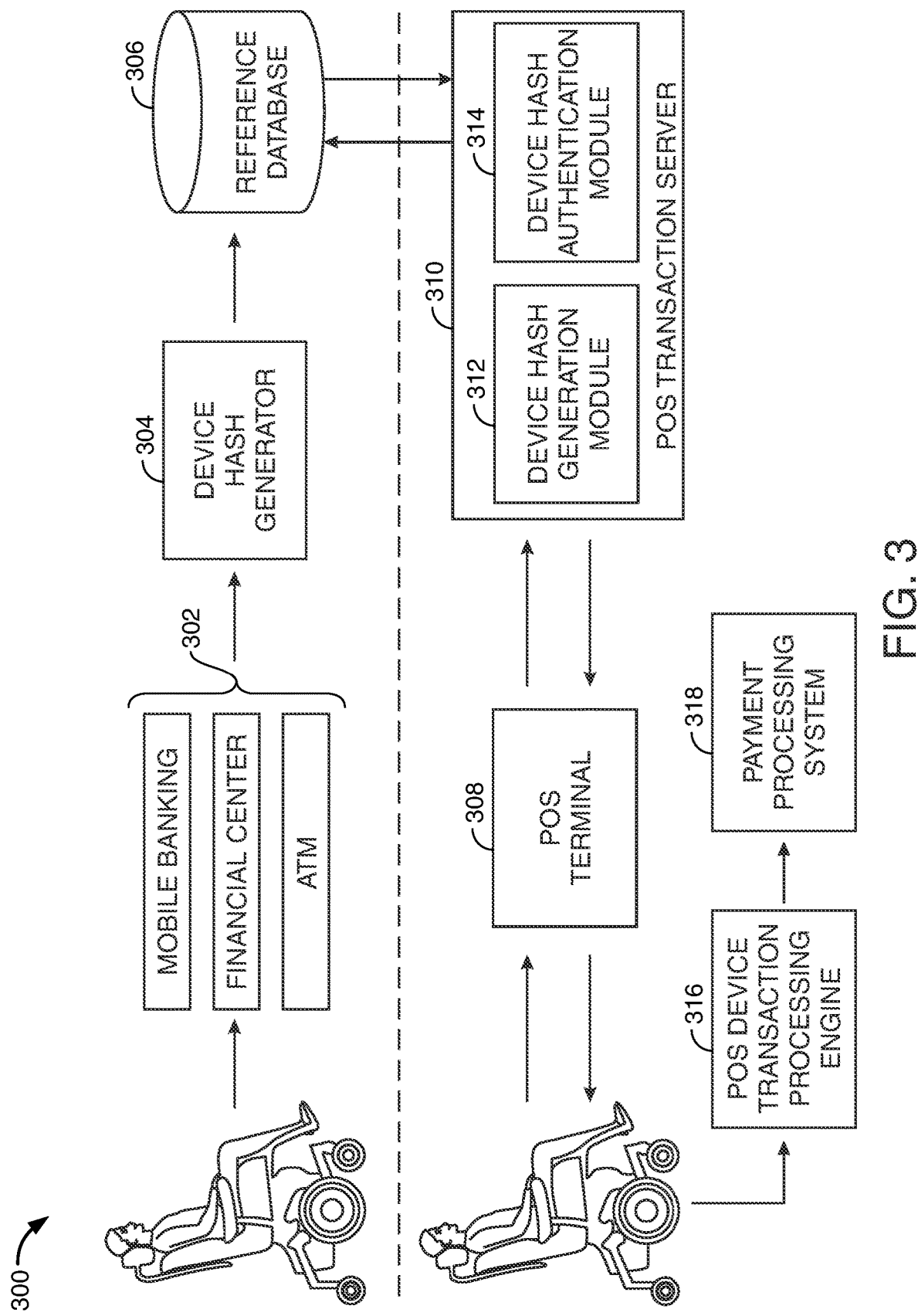
FIG. 3 shows an illustrative process flow in accordance with principles of the disclosure.

FIG. 3 shows illustrative process flow 300 for transaction execution via a power-driven wheelchair. While the illustrative use case involves a wheelchair, the invention is operable with a variety of assistive devices, as set forth above.

Elements 302-306 illustrate registration of the wheelchair. A user may register the wheelchair at banking channels 302. Illustrative banking channels shown include a mobile banking application, financial center and ATM, but any suitable channel may be used. Banking channels 302 may receive customer information such as a name or account number. Banking channels 302 may interact with the wheelchair to determine a device identifier. Device hash generator 304 may apply one or more hashing algorithms to generate a reference hash that incorporates the customer identifier and the device identifier. The reference hash may be stored in reference database 306.

Elements 308-318 illustrate transaction execution at a POS using the registered wheelchair. While the illustrative use case involves a POS transaction, the invention is operable in a variety of transaction scenarios, as set forth above.

Elements 308-314 illustrate authentication of the wheelchair. POS terminal 308 may initiate an active session with the wheelchair and retrieve the customer identifier and device identifier. In some embodiments, the active session may be initiated at the wheelchair through voice, touch, or gesture inputs, through manipulation of a joystick, or by any suitable method.

POS terminal 308 may transmit the customer identifier and device identifier to POS transaction server 310. POS transaction server 310 may retrieve the reference hash from reference database 306. Device hash generation module 312 may generate a new hash from the customer identifier and device identifier obtained at the POS. Device hash authentication module 312 may compare the new hash to the reference hash to authenticate the wheelchair.

The authentication may be transmitted to POS terminal 308. POS terminal 308 may communicate transaction data to a display integrated into the wheelchair. The wheelchair may display the transaction information. The wheelchair may receive an input from the user selecting a payment instrument or confirming the transaction. The input may be transmitted to POS device transaction processing engine 316. The completed transaction data may be transmitted to payment processing system 318 for processing.

In some embodiments (not shown), the input may be transmitted to POS terminal 308. POS terminal 308 may transmit transaction information to POS device transaction processing 316 or payment processing system 318.

Figure 4:
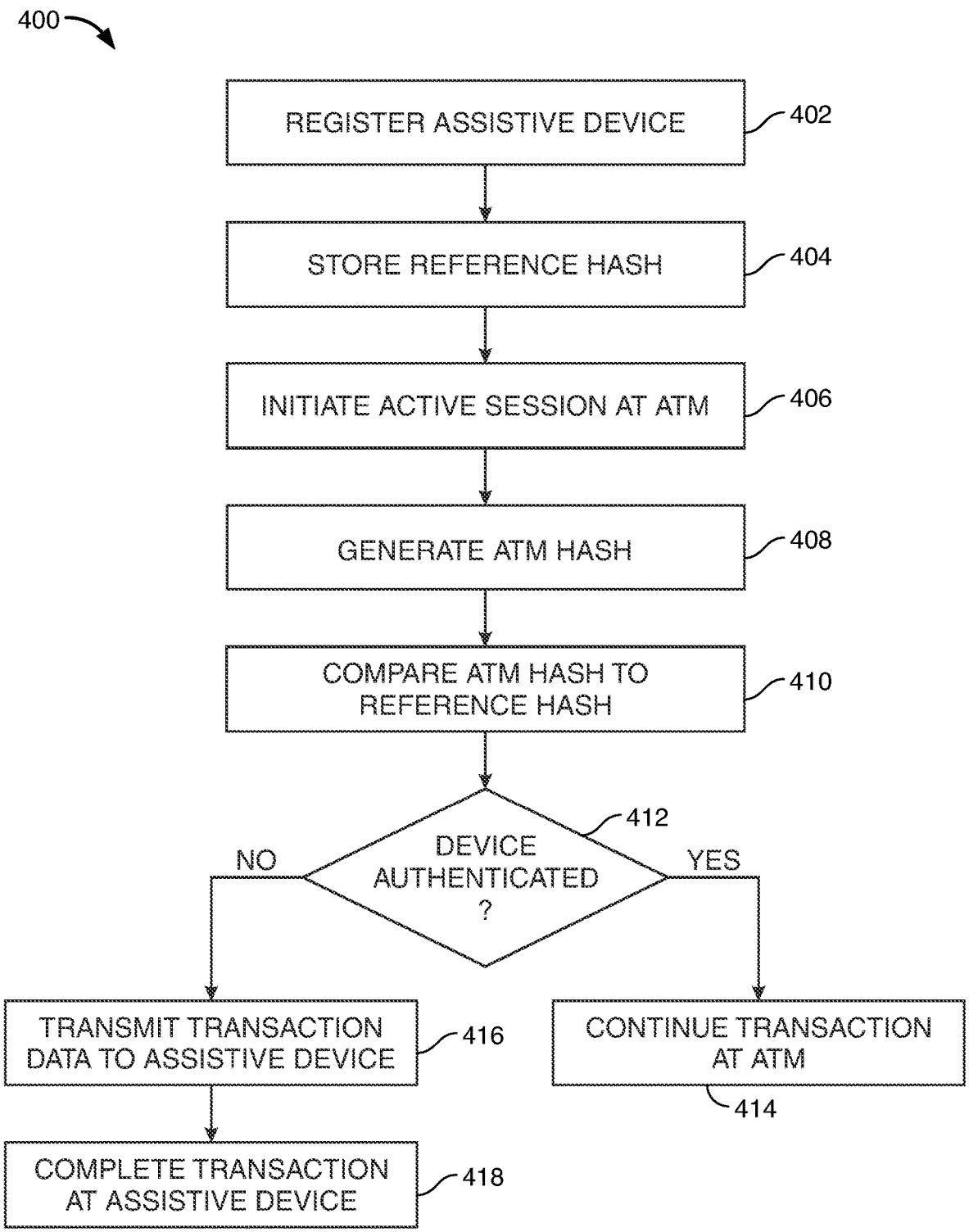
FIG. 4 shows an illustrative process flow in accordance with principles of the disclosure.

FIG. 4 shows illustrative process flow 400 for transaction execution via an assistive device at an ATM.

At step 402, an assistive device is registered with a financial institution. At step 404 a reference hash is generated based on a customer identifier and a device identifier obtained from the assistive device. The reference hash may be stored. The reference hash may be a hardware-based reference hash and the device identifier may be encoded into the assistive device.

At step 406, the customer initiates an active session at an ATM. The device may use short-term wireless transmission to provide a customer identifier and a device identifier directly to the ATM. At step 408, a new hash may be generated using the data obtained by the ATM.

At step 410, the new hash may be compared to the reference hash. At step 412, authentication may be determined based on the comparison. At step 414, if the assistive device is not authenticated, the transaction may continue at the ATM. At step 416, if the assistive device is authenticated, transaction data may be transmitted to the assistive device. At step 418, the transaction may be completed at the assistive device.

Thus, methods and apparatus for SPECIALIZED TRANSACTION EXECUTION VIA ASSISTIVE DEVICES are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for secure transaction execution at an electric personal assistive mobility device, the method comprising:
at a financial institution interface:
receiving a customer identifier;
receiving a mobility device identifier, the mobility device identifier encoded in hardware embedded in the mobility device;
generating a first hash from the customer identifier and the mobility device identifier; and
storing the first hash in a reference database in association with the customer identifier; and
at a point of sale (POS):
establishing an active session with the mobility device through short-range wireless communication, the mobility device being configured to communicate with a POS terminal at the POS using near field communication (NFC);
receiving the customer identifier and the mobility device identifier from the mobility device;
generating a second hash from the customer identifier and the mobility device identifier;
transmitting a request to the financial institution for the first hash;
comparing the second hash to the first hash to authenticate the mobility device; and
when a percentage correlation between the second hash and the first hash meets or exceeds a predetermined threshold:
routing transaction data to a display integrated into the mobility device; and
executing the transaction based at least in part on an input at the mobility device.

2. The method of claim 1, wherein a POS terminal is configured to transmit the customer identifier and mobility device identifier received from the mobility device to a POS transaction server for authentication of the mobility device.

3. The method of claim 2, wherein the POS transaction server comprises a device hash generation module.

4. The method of claim 1, wherein the input at the mobility device comprises consent to the transaction.

5. The method of claim 4, wherein consent to the transaction is entered using a mobility device joystick.

6. The method of claim 1, further comprising, when the percentage correlation between the second hash and the first hash meets or exceeds a predetermined threshold, disabling a requirement for entry of a personal identification number (PIN).

7. The method of claim 1, further comprising restricting use of a payment instrument to transactions executed via the mobility device.

8. One or more non-transitory computer-readable media storing computer-executable instructions which, when executed by a processor on a computer system, perform a method for securely executing a transaction at a power-assisted mobility aid, the method comprising:
receiving a customer identifier at a banking channel;
receiving a mobility aid identifier at the banking channel, the mobility aid identifier encoded in hardware embedded in the mobility aid;
generating a first hash from the customer identifier and the mobility aid identifier; and
storing the first hash in a reference database in association with the customer identifier;
establishing an active session with the mobility aid through short-range wireless communication at a point of sale (POS);
receiving the customer identifier and the mobility aid identifier from the mobility aid at a POS terminal located at the POS via short-range wireless data transfer, the mobility aid being configured to communicate with the POS terminal using ultra-wide band communication;
generating a second hash from the customer identifier and the mobility aid identifier;
comparing the second hash to the first hash to authenticate the mobility aid; and
when a percentage correlation between the second hash and the first hash meets or exceeds a predetermined threshold:
routing transaction data to a display integrated into the mobility aid; and
executing the transaction in response to an input at the mobility aid.

9. The media of claim 8, wherein the POS terminal is configured to transmit the customer identifier and mobility aid identifier to a POS transaction server for authentication of the mobility aid.

10. The media of claim 9, wherein the POS transaction server comprises a device hash generation module.

11. The media of claim 8, wherein the input at the mobility aid comprises consent to the transaction.

12. The media of claim 11, wherein consent to the transaction is received via voice-based input.

13. The media of claim 8, further comprising, when the percentage correlation between the second hash and the first hash meets or exceeds a predetermined threshold, disabling a requirement for entry of a personal identification number (PIN).

14. The media of claim 8, further comprising restricting use of a payment instrument to transactions executed via the mobility aid.

\* \* \* \* \*